Jan. 7, 1969     K. C. KUSMER     3,420,326
LAND VEHICLE PROPULSION
Filed Sept. 16, 1966
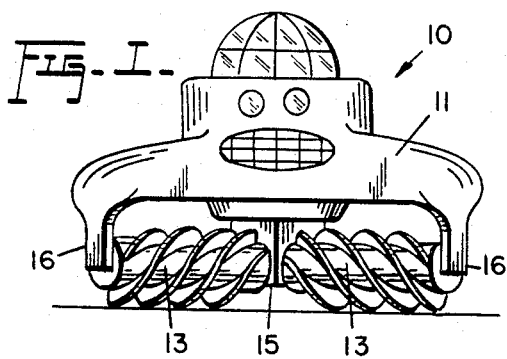
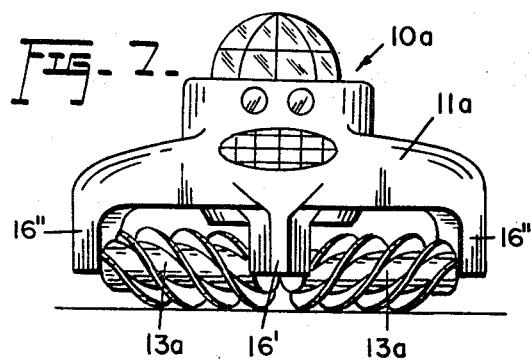
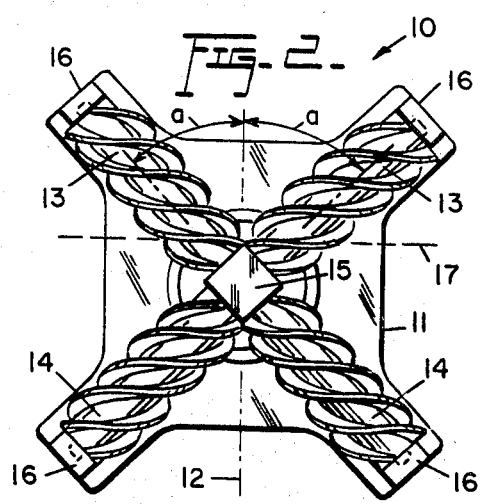
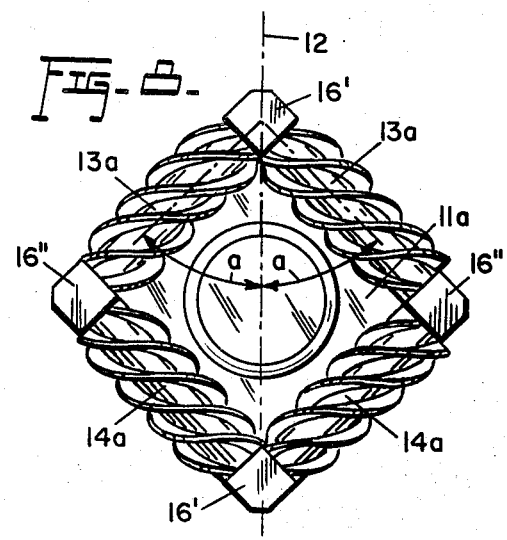
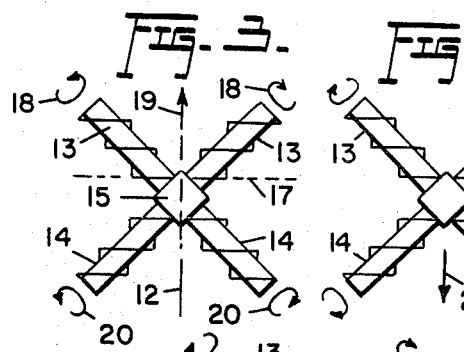
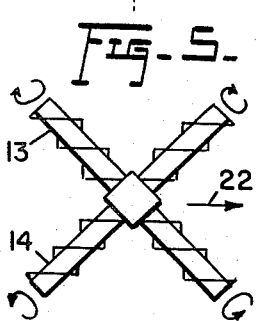
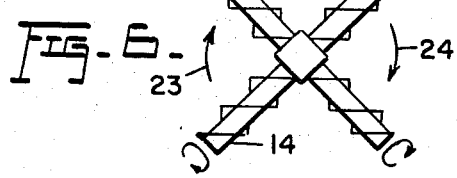
INVENTOR:
KASIMIR C. KUSMER
By: *Jerry B. Besak*

United States Patent Office 3,420,326
Patented Jan. 7, 1969

3,420,326
LAND VEHICLE PROPULSION
Kasimir C. Kusmer, Montgomery, Ill.
(1021 Cochran St., Aurora, Ill. 60506)
Filed Sept. 16, 1966, Ser. No. 580,099
U.S. Cl. 180—6.2                                    7 Claims
Int. Cl. B62d 11/00; B62d 57/00; B60f 3/00

ABSTRACT OF THE DISCLOSURE

A land vehicle having propulsion means consisting of two pairs of rotatable ground engaging screws. The screws have their axes offset by an acute angle to opposite sides of the longitudinal axis of the vehicle represented by its direction of travel, with the axis of each screw intersecting the axes of two other screws. Means are provided for rotating the screws in each pair selectively in opposite directions.

---

This invention relates to new and useful improvements in land vehicles, and the principal object of the invention is to provide a tractor-type vehicle with novel screw propulsion means whereby to facilitate positive traction on soft ground, mud, marsh, ice, snow or other terrain where traction by ordinary wheels would be difficult if not impossible.

Within the context of the invention, the land vehicle is intended to be understood as being also capable of traveling through water where such exists on land. The vehicle has possible uses on Earth as well as on the surface of the Moon or the planets. It may be employed for civilian or military purposes, either by itself or as a tractor for other vehicles which may be drawn thereby. Also, it may be a full-size embodiment capable of accommodating a crew, or it may be manufactured on a small scale for use as a toy. In any event, the essence of the invention resides in the provision of novel screw propulsion means utilizing at least two pairs of propulsion or traction screws. The screws in each pair have their axes offset by an acute angle to opposite sides of a central longitudinal axis represented by the line of travel of the vehicle, and the spiral screw vanes at the underside of the screws are in substantial alignment transversely to that longitudinal axis so that the combined action of the screws produces a very positive tractive effort.

The individual screws are driven selectively in opposite directions, and by virtue thereof the vehicle is capable of movement forwardly, rearwardly or sideways, as well as turning about its own vertical axis.

With the foregoing more important object and features in view and such other objects and features as may become apparent as this specification proceeds, the invention will be understood from the following description taken in conjunction with the accompanying drawings, wherein like characters of reference are used to designate like parts, and wherein:

FIGURE 1 is an elevational view showing one embodiment of the vehicle in accordance with the invention;

FIGURE 2 is an underside plan view thereof;

FIGURES 3-6 inclusive are diagramatic illustrations showing different screw rotations for different directions of travel;

FIGURE 7 is an elevational view of a modified embodiment; and

FIGURE 8 is an underside plan view of the embodiment of FIG. 7.

Referring now to the accompanying drawings in detail, more particularly to FIGS. 1 and 2, the same show a tractor-type vehicle designated generally by the numeral 10. This comprises a suitable vehicle body 11 such as may be capable of accommodating a crew, engines, power transmissions, fuel, supplies, et cetera, and since the vehicle is capable of forward, rearward as well as sideways movement, the body 11 may be symmetrical about its central vertical axis, so that in side elevation it is much like when viewed from front or rear. However, for purposes of this description, the vehicle is presumed to have a central longitudinal axis indicated at 12 in FIG. 2, this axis being represented by the line of travel of the vehicle in either forward or rearward direction.

The screw-type propulsion means of the vehicle comprise at least two pairs of ground engaging screws 13, 13 and 14, 14 which are rotatably mounted at the underside of the vehicle body 11. This mounting may be effected in any suitable manner. In the embodiment of FIGS. 1 and 2 a depending housing or case 15 is provided centrally at the underside of the body 11 and affords bearings for the inner ends of the screws which extend radially outwardly from the case, the outer ends of the screws being journalled in four depending corner posts 16 with which the body 11 is equipped, as shown.

The screws in each pair are offset by an acute angle to opposite sides of the longitudinal axis 12, as indicated at $a, a$ in FIG. 2 for the screws 13, 13. In the illustrated instance the angle $a$ corresponds to 45°, although it may be greater or lesser than that. Moreover, the pitch of the spiral screw vanes is coordinated with the angular offset of the screws so that the vanes at the underside or ground-contacting part of the screws are in substantial alignment transversely to the longitudinal axis 12, as indicated by the dotted line 17. In other wordds, if the screws are offset by 45° from the longitudinal axis 12, the vanes are pitched at 45° to the screw axis so that at the underside of the screws the vanes are transverse or at right angles to the axis 12 and hence to the direction of travel. Alternatively, if the offset of the screws is other than at 45°, as for example at 30°, the vanes would be pitched at 60° to the screw axis, thus again locating them transversely or at right angles to the axis 12. This transverse disposition of the screw vanes at the underside of the screws affords optimum traction and positive engagement with the ground when the screws are rotated in certain directions as hereinafter described.

Each of the screws 13, 13, 14, 14 is adapted to be rotated selectively in either direction, which may be accomplished in any suitable manner. For example, a reversible electric motor may be operatively connected to each individual screw, four such motors being provided for the four respective screws. Alternatively, a single motor or engine may drive all four screws through a selective gear box, permitting each screw to be driven in either direction. In any event, whatever drive mechanism is employed, it may be housed within the body 11 and/or within the case 15, and for purposes of this application the case 15 may be regarded as illustrative of the drive mechanism.

Reference is now drawn to the diagramatic illustrations in FIGS. 3-6 inclusive, all of which show bottom plan views of the screws as in FIG. 2. In FIG. 3, the two screws, 13, 13 are rotated in mutually opposite directions as indicated by the arrows 18, so as to produce movement of the vehicle along the longitudinal axis 12 in a forward direction shown by the arrow 19. The screws 13, 13 are forwardly divergent and when rotated in the directions 18, the vanes at the underside of the screws turn inwardly toward the axis 12. However, the screws, 14, 14 are forwardly convergent and are rotated in mutually opposite directions indicated at 20, so that the vanes at the underside of these screws turn outwardly from the axis 12. As already stated, this produces forward travel in the direction of the arrow 19.

Rearward travel in the direction of the arrow 21 in FIG. 4 is obtained by reversing the direction of rotation of all the screws, as will be apparent by comparison of FIGS. 3 and 4.

As previously indicated, optimum traction results when the screw vanes at the underside of the screws are transverse to the line of travel, this being the situation when the vehicle moves either forwardly or rearwardly. However, lateral or sideways travel in a crab-like manner may also be possible, even if at lesser tractive efficiency, by rotating the screws as indicated in FIG. 5 to produce sideways travel indicated by the arrow 22. In this event the vanes at the underside of the screws are parallel to the line of sideways travel, but the spiralling action of the vanes may nevertheless be sufficient to produce the sideways movement. Of course, by reversing the rotation of all the screws with respect to that shown in FIG. 5, sideways travel in a direction opposite to the arrow 22 would result.

Finally, as shown in FIG. 6, when all the screws are rotated in the same direction, the vehicle may be caused to turn about its own vertical axis, either as at 23 or as at 24, depending upon the direction of screw rotation. This maneuver may be particularly useful for purposes of steering, when the line of travel of the vehicle is to be changed from one direction to another.

FIGS. 7 and 8 show a modified embodiment of the screw propulsion in a vehicle 10a having a body 11a with four depending corner posts, namely, two posts 16' which are spaced longitudinally and two posts 16" which are spaced transversely with respect to the longitudinal axis or line or travel 12. Here the traction screws do not radiate outwardly from the center as in the embodiment of FIGS. 1 and 2, but rather, they extend obliquely between the corner posts, the screws 13a, 13a being forwardly convergent and the screws 14a, 14a being forwardly divergent, as shown. The reversible drive mechanism for the screws is embodied in the posts 16', 16" and the vehicle is capable of the same maneuvers as explained in connection with FIGS. 3–6 by proper coordination of directions of screw rotation, except that in the instance of any given movement, the screw rotation in FIGS. 7–8 is reversed from that in FIGS. 1–2, inasmuch as in FIGS. 7–8 the screws 13a, 13a are forwardly convergent and the screws 14a, 14a are forwardly divergent, while in FIGS. 1–2 a reverse situation obtains. It may be noted that in both embodiments of the invention the vehicle is supported and propelled solely by the traction screws, no conventional wheels, or the like, being present.

While in the foregoing there have been described and shown the preferred embodiments of the invention, various modifications may become apparent to those skilled in the art to which the invention relates. Accordingly, it is not desired to limit the invention to this disclosure, and various modifications and equivalents may be resorted to, falling within the spirit and scope of the invention as claimed.

What is claimed as new is:

1. A land vehicle having a body and screw-type propulsion means therefor, said propulsion means comprising at least two pairs of ground engaging screws rotatably mounted at the underside of said body, said screws having their axes fixed relative to one another and offset by an acute angle to opposite sides of a central longitudinal axis represented by the line of travel of the vehicle with the axis of each screw intersecting the axes of at least two other screws, and means for driving said screws.

2. The device as defined in claim 1 wherein said screws have spiral vanes which at the underside of the screws are in substantial alignment tranversely to said central longitudinal axis.

3. The device as defined in claim 1, wherein said screws constitute sole means for supporting and propelling said vehicle body.

4. The device as defined in claim 1, wherein each screw in each pair is rotatable selectively in opposite directions.

5. The device as defined in claim 1, wherein the screws in the one pair are forwardly divergent and the screws in another pair are forwardly convergent in the direction of travel of the vehicle.

6. The device as defined in claim 1, wherein said screw driving means are located substantially centrally at the underside of said body, said screws extending radially outwardly from said driving means.

7. The device as defined in claim 1, wherein said screw driving means are located at two longitudinally spaced points and at two transversely spaced points at the underside of said body, said screws extending obliquely between said driving means.

References Cited

UNITED STATES PATENTS

| 864,106 | 8/1907 | Peavey | 180—7 |
| 1,228,093 | 5/1917 | Burch | 180—3 |
| 1,602,547 | 10/1926 | Norum | 180—3 |
| 1,672,613 | 6/1928 | Howell | 115—19 |
| 3,333,563 | 8/1967 | De Bakker | 115—1 |

FOREIGN PATENTS 1,059,748  11/1953  France.

BENJAMIN HERSH, *Primary Examiner.*

J. A. PEKAR, *Assistant Examiner.*

U.S. Cl. X.R.

115—1; 180—7